(12) United States Patent
Berkman et al.

(10) Patent No.: US 7,383,355 B1
(45) Date of Patent: Jun. 3, 2008

(54) SYSTEMS AND METHODS FOR PROVIDING CENTRALIZED MANAGEMENT OF HETEROGENEOUS DISTRIBUTED ENTERPRISE APPLICATION INTEGRATION OBJECTS

(75) Inventors: Peter C. Berkman, San Dimas, CA (US); Gevik H. Nalbandian, Northridge, CA (US); Jerry A. Waldorf, West Hills, CA (US); Rangaswamy Srihari, Arcadia, CA (US); Alexander Demetriades, Pasadena, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 990 days.

(21) Appl. No.: 09/703,888

(22) Filed: Nov. 1, 2000

(51) Int. Cl.
*G06F 15/16* (2006.01)
*G06F 15/173* (2006.01)
*G06F 9/44* (2006.01)

(52) U.S. Cl. ............ 709/246; 709/201; 709/249; 709/223; 719/311; 719/313

(58) Field of Classification Search ......... 709/203, 709/201, 202, 223, 224, 226, 313, 314, 315, 709/246, 249; 719/311, 313
See application file for complete search history.

(56) References Cited

U.S. PATENT DOCUMENTS

| | | | |
|---|---|---|---|
| 4,577,272 A | | 3/1986 | Ballew et al. |
| 5,133,053 A | | 7/1992 | Johnson et al. |
| 5,414,812 A | | 5/1995 | Filip et al. |
| 5,457,797 A | * | 10/1995 | Butterworth et al. ....... 719/320 |
| 5,513,343 A | * | 4/1996 | Sakano et al. ............... 714/26 |
| 5,557,798 A | | 9/1996 | Skeen et al. |
| 5,602,991 A | * | 2/1997 | Berteau ...................... 709/227 |
| 5,606,693 A | * | 2/1997 | Nilsen et al. ................ 707/10 |
| 5,696,969 A | | 12/1997 | Egolf |
| 5,751,962 A | * | 5/1998 | Fanshier et al. ............ 709/223 |
| 5,754,856 A | | 5/1998 | Klein |
| 5,758,154 A | * | 5/1998 | Qureshi ......................... 713/1 |
| 5,841,972 A | * | 11/1998 | Fanshier ..................... 709/220 |
| 5,913,061 A | * | 6/1999 | Gupta et al. ................ 719/310 |
| 5,916,307 A | | 6/1999 | Piskiel et al. |

(Continued)

FOREIGN PATENT DOCUMENTS

EP 1016989 A2 7/2000

OTHER PUBLICATIONS

"Transforming Business Data into Business Events," by JP Morgenthal, Published in EAI Journal, Nov./Dec. 1999.

(Continued)

*Primary Examiner*—Glenton B. Burgess
*Assistant Examiner*—Kevin Bates
(74) *Attorney, Agent, or Firm*—Hickman Palermo Truong & Becker LLP

(57) ABSTRACT

In the distributed enterprise application integration system, modularized components located on multiple hosts are centrally managed so as to facilitate communication among application programs. Collaboration services traditionally associated with a central server, such as, for example, message queues, message publishers/subscribers, and message processes, are instead distributed to multiple hosts and monitored by a central registry service. This system allow configuration management to be performed in a central location using a top-level approach, while implementation and execution tasks are distributed and delegated to various components that communicate with the applications.

48 Claims, 13 Drawing Sheets

U.S. PATENT DOCUMENTS

| | | | |
|---|---|---|---|
| 5,930,503 A | | 7/1999 | Drees |
| 5,933,601 A | * | 8/1999 | Fanshier et al. ............ 709/223 |
| 5,944,783 A | * | 8/1999 | Nieten ........................ 709/202 |
| 5,960,178 A | | 9/1999 | Cochinwala et al. |
| 5,964,831 A | * | 10/1999 | Kearns et al. .............. 709/201 |
| 6,003,083 A | * | 12/1999 | Davies et al. ............... 709/226 |
| 6,014,700 A | | 1/2000 | Bainbridge et al. |
| 6,236,999 B1 | * | 5/2001 | Jacobs et al. .................. 707/10 |
| 6,256,676 B1 | * | 7/2001 | Taylor et al. ............... 709/246 |
| 6,308,178 B1 | * | 10/2001 | Chang et al. ............... 709/225 |
| 6,351,775 B1 | * | 2/2002 | Yu ............................. 709/238 |
| 6,401,119 B1 | * | 6/2002 | Fuss et al. .................. 709/224 |
| 6,445,919 B1 | * | 9/2002 | Suonvieri ................... 455/424 |
| 6,466,965 B1 | * | 10/2002 | Chessell et al. ............ 709/203 |
| 6,510,466 B1 | * | 1/2003 | Cox et al. ................... 709/229 |
| 6,687,698 B1 | * | 2/2004 | Nixon et al. .................. 707/10 |
| 6,772,216 B1 | * | 8/2004 | Ankireddipally et al. ... 709/230 |
| 6,779,184 B1 | * | 8/2004 | Puri et al. ................... 719/315 |

OTHER PUBLICATIONS

"Market Segmentation EAI," by Beth Gold-Bernstein, Published in EAI Journal, Jul./Aug. 1999.

"Workflow and EAI," by John E. Mann, Published in EAI Journal, Sep./Oct. 1999.

"An Overview of Message Brokers," by Roy Schulte, Published in Messageq.com, downloaded on Nov. 5, 1999.

"Integrate Business Processes to Develop a Cohesive IT Infrastructure," by Jeremy M. Davis, Published in EAI Journal.com, downloaded on Jan. 5, 2000.

"How to Free Your Information: Selecting a Message Broker—Part 1," by David Linthicum, Published in Messageq.com, downloaded on Nov. 5, 1999.

"How to Free Your Information: Selecting a Message Broker—Part 2," by David Linthicum, Published in Messageq.com, downloaded on Nov. 5, 1999.

"MQSeries Workflow," Published by IBM Corp., Feb. 11, 2000.

Examiner's first report on Patent Application No. 2001226208, Australian Government, dated Oct. 12, 2006 (3 pages).

CSIRO Middleware Technology Evaluation Series, entitled "Evaluating Forte 4GL Release 3", Version 1.1, pp. 7-25 (20 pgs) dated Jul. 2000.

CSIRO Middleware Technology Evaluation Series, entitled "Evaluating Visibroker ITS Version 1.2", Version 1.0, pp. 9-29 (22 pages) dated Nov. 2000.

Examiner's Second Report from AU for foreign patent application No. 2001226208 dated May 24, 2007, (3 pgs).

Current claims for AU foreign patent application No. 2001226208, (5 pgs).

Office Action from KO for foreign patent application No. 10-2003-7006085 dated Jun. 17, 2007, with English translation (7 pgs).

Current claims for KO foreign patent application No. 10-2003-7006085, (13 pgs).

* cited by examiner

SYSTEMS AND METHODS FOR PROVIDING CENTRALIZED MANAGEMENT OF HETEROGENEOUS DISTRIBUTED ENTERPRISE APPLICATION INTEGRATION OBJECTS

FIELD OF THE INVENTION

The system and method of the present invention relate generally to the field of application integration.

BACKGROUND

The increased growth of the software industry has made a large variety of applications available to the public, and the public has learned to rely heavily upon these applications. Furthermore, it is common for businesses to employ multiple applications within their companies for day-to-day activities. Because these applications are provided by various vendors, coordination to support routine business operation becomes a daunting task often requiring manual labor provided by resources that could be used elsewhere. Thus, it is important for businesses to enable their applications to communicate and share information in an efficient and secure manner.

While businesses need the ability to integrate their applications to coordinate and share information, it is often difficult to allow such integration. One common problem with conventional approaches is that they require businesses to employ new solutions every time the business changes or needs to make changes to its existing applications. Such approaches are extremely costly, cause extensive interruption to the business, often fail to meet the business's expectations, and do not offer solutions for the future.

Another common problem with conventional approaches is that they require the customization of each application so that the application can communicate with the business's other applications. This approach also is costly in terms of both time and money. Furthermore, this approach affords little if no flexibility when the business needs to update, add to, or alter its applications.

An additional problem with conventional approaches is that they rely upon a central component to manage and process all inter-application communication. This "hub and spoke" model leaves the business vulnerable to a single point of failure in that if the central component goes down, the entire business goes down. Furthermore, the central component may also produce a bottleneck effect in situations where the central component is overworked and unable to keep up with the demanding workload.

SUMMARY OF THE INVENTION

In the centralized management system, distributed components located on multiple hosts are centrally managed so as to facilitate communication among application programs. Components traditionally associated with a central server, such as, for example, message queues, message publishers/subscribers, and message processes, are instead distributed to multiple hosts and monitored by a central registry service. This system allow business process modeling to be performed in a central location using a top-level approach, while implementation and execution tasks are distributed and delegated to various components that communicate with the applications.

In one embodiment, the present invention is a scalable enterprise application collaboration system that enables the management of a plurality of reusable distributed objects running in a heterogeneous application environment. The scalable enterprise application collaboration system comprises a central host including a fault tolerant central registry system having a first central registry and a redundant central registry, wherein the central host is configured to manage the plurality of reusable distributed objects, send configuration change alerts to the plurality of reusable distributed objects, and provide configuration data to the plurality of distributed objects from one of the first central registry and the redundant central registry, wherein if the first central registry is unavailable, the redundant central registry is used. In addition, the scalable enterprise application collaboration system comprises the plurality of reusable distributed objects, wherein the plurality of reusable distributed objects are in communication with the central host to receive configuration change alerts and to download configuration data from the central host's fault tolerant central registry system. The scalable enterprise application collaboration system also comprises a plurality of heterogeneous applications, wherein the plurality of heterogeneous applications are configured to communicate via the plurality of reusable distributed objects in accordance with the configuration data.

An additional embodiment of the present invention is a method of centrally managing distributed components and dynamically implementing configuration information related to the distributed components in a distributed enterprise application system. The method comprises storing in a first computer system a central registry database including configuration information related to distributed components wherein the distributed components are located in remote computer systems and receiving requests from the distributed components for configuration information updates. The method also comprises determining configuration changes to be implemented in response to the requests and modifying the central registry database to reflect at least a portion of the configuration changes. In addition, the method comprises allocating the configuration changes to the corresponding distributed components; and transferring the configuration changes to the corresponding distributed components wherein the configuration changes are implemented in the corresponding distributed components.

Another embodiment of the present invention is a method of centrally managing distributed components and dynamically implementing configuration information related to the distributed components in a distributed enterprise application system. The method comprises storing in a first computer system a central registry database containing configuration information related to distributed components wherein the distributed components are located in remote computer systems and receiving at the first computer system data translation and messaging configuration information from a configuration information input module wherein configuration information is accessed and modified by a user and sent to the first computer system. The method also comprises determining configuration information changes to be implemented in response to the messaging and data configuration information and modifying the central registry database to reflect at least a portion of the configuration changes. In addition, the method comprises allocating the configuration changes to corresponding distributed components located in remote computer systems and transferring the configuration changes to the corresponding distributed components wherein the configuration information changes are implemented in the corresponding distributed components.

Another embodiment of the present invention is a method of centrally managing distributed components and dynamically implementing configuration information related to the distributed components in a distributed enterprise application system. The method comprises storing in a first computer system a central registry database containing configuration information related to a first distributed component located in a first computer system and a second distributed component located in a second computer system and receiving requests from at least one of the first distributed component or the second distributed component configuration update requests. The method also comprises determining configuration changes to be implemented in response to the requests and modifying the central registry database to reflect at least a portion of the configuration changes. In addition, the method comprises allocating the configuration changes to at least one of the first distributed component or the second distributed component and transferring the configuration changes to at least one of the first distributed component or the second distributed component wherein the configuration changes are implemented on at least one of the first distributed component or the second distributed component.

Another embodiment of the present invention is a distributed enterprise application integration system used to centrally manage distributed components and to permit dynamic implementation of configuration data to distributed components. The distributed enterprise application system comprises a central control module stored in a first computer, the central control module including a central registry database used to store configuration data about a distributed enterprise application system, wherein the central control module is configured to process requests for component configuration updates, process changes for the central registry database, and forward component configuration data to a plurality of distributed components. The distributed enterprise application system also comprises a plurality of distributed components including corresponding component control modules, the plurality of distributed components stored on a plurality of computers. The plurality of distributed components are configured to perform data related and messaging activities in compliance with component configuration data. Further, the component control modules are configured to implement component configuration data and communicate with the central control module to receive component configuration data, send requests for component configuration updates, and send changes to the central registry database.

Another embodiment of the present invention is a distributed, multi-platform application integration system. The system comprises a central host including a central registry system. The system also comprises a plurality of application hosts including corresponding control brokers wherein the control brokers are configured to communicate with the central registry system to receive configuration data. In addition, the system comprises a plurality of multi-platform applications corresponding to the plurality of application hosts wherein the plurality of multi-platform applications are configured to communicate via the plurality of application hosts in accordance with the configuration data.

Another embodiment of the present invention is a method for integrating distributed applications. The method comprises managing requests for configuration changes from at least a first source and collecting configuration change information from a plurality of sources related to the requests for configuration changes. The method also comprises disseminating the configuration change information related to the requests for configuration changes to a plurality of distributed components servicing distributed applications, wherein at least a first application is executed on a first operating system and a second application is executed on a second operating system wherein the first operating system and the second operating system are not the same operating system.

Another embodiment of the present invention is a method for integrating distributed applications that comprises sending requests for data-related and messaging-related configuration changes from a first host to a central host. The method also comprises receiving at the first host configuration change information from a central host related to the requests for configuration changes and implementing at the first host data translation and messaging configuration changes according to the configuration change information.

Another embodiment of the present invention is a method of integrating a plurality of multi-platform applications located on a distributed network. The method comprises providing a plurality of integration modules corresponding to a plurality of multi-platform applications, wherein the plurality of integration modules perform data-related and messaging activities enabling communication among the plurality of multi-platform applications. The method also comprises providing a central host module, including a central database of configuration data, wherein the central host module manages and distributes configuration data to the plurality of integration modules and the configuration data includes instructions for allowing communication among the plurality of multi-platform applications.

Another embodiment of the present invention is a method of implementing a distributed application communication system between a first independent application and a second independent application. The method comprises creating a representation of a first set of data that is sent from a first independent application to a data translation module, translated into a second set of data, and forwarded to a second independent application. The method also comprises converting the representation into sets of data translation and messaging instructions and distributing the sets of data translation and messaging instructions to a first data translation implementation module communicating with a first independent application and a second data translation implementation module communicating with a second independent application. The first data translation implementation module communicates with the second data translation implementation module in accordance with the sets of data translation and messaging instructions.

Another embodiment of the present invention is a distributed application integration system, including a central host and a plurality of application hosts communicating with a plurality of multi-platform applications. The distributed application integration system comprises central host means for representing collective configuration information and central host means for allocating portions of the collective configuration information to a plurality of application hosts. The plurality of application hosts communicate with a plurality of corresponding multi-platform applications and the plurality of application hosts implement the portions of the collective information to enable communication among the plurality of corresponding multi-platform applications.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 3B illustrates a screen shot of one embodiment of a central registry GUI.

FIG. 3C illustrates a screen shot of one embodiment of a central registry GUI.

DETAILED DESCRIPTION

Figure 1:
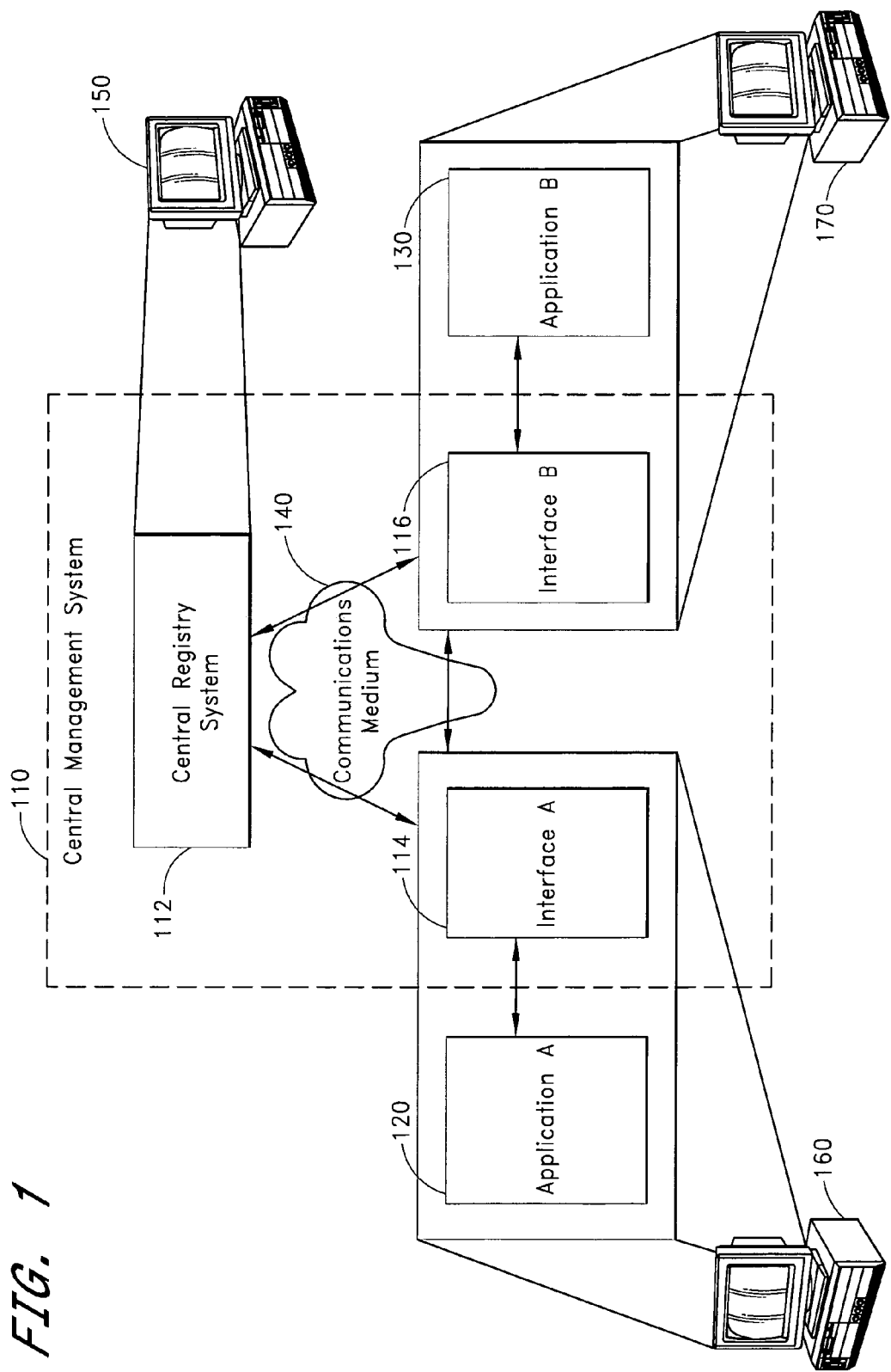
FIG. 1 illustrates a high-level block diagram of one embodiment of an application integration system that includes a centralized management system.

A system and method which represent one embodiment and example application of the invention will now be described with reference to the drawings. Variations to the system and method which represent other embodiments will also be described. In one disclosed embodiment, the system and method are used to allow communication among a set of business application programs.

For purposes of illustration, one embodiment will be described in the context of business application programs. The inventors contemplate that the present invention is not limited by the type of programs discussed, and that the types of objects may include any program, such as, for example, a software module, a business application program, a database, an accounting program, a music program, a telephone system, and so forth. The figures and descriptions, however, relate to an embodiment of the invention wherein the program is a business application program. Furthermore, it is recognized that in other embodiments, the system and method for centrally managing distributed objects may be implemented as a single module and/or implemented in conjunction with a variety of other modules and the like. Moreover, the specific implementations described herein are set forth in order to illustrate, and not to limit, the invention. The scope of the invention is defined by the appended claims.

These and other features will now be described with reference to the drawings summarized above. The drawings and the associated descriptions are provided to illustrate embodiments of the invention, and not to limit the scope of the invention. Throughout the drawings, reference numbers may be re-used to indicate correspondence between referenced elements. In addition, the first digit of each reference number indicates the figure in which the element first appears.

In the centralized management system, distributed components located on multiple hosts are centrally managed so as to facilitate communication among application programs. Collaborative services traditionally associated with a central server, such as, for example, message queues, message publishers/subscribers, and message processes, are instead distributed to multiple modular components and monitored by a central registry service. This system allows configuration management to be performed in a central location using a top-level approach, while implementation and execution tasks are distributed and delegated to various components that communicate with the applications.

To illustrate, in one embodiment, a user may use a graphical user interface tool to create a graphical representation of a business process that shows how he wants his applications to communicate. The centralized management system takes the representation and determines which distributed components are needed to implement the business process as well as the tasks that each distributed component should perform. Next, the centralized management system locates the distributed components and forwards them their corresponding task information.

Furthermore, in one embodiment this architecture provides a flexible topology by permitting a set of distinct modularized components to work together and replace a single process flow execution. Typically, in a central server system, transactions are executed on a first-in-first-out basis. But in reality, many business processes require both parallel and serial processing. Often, these processes may need to be performed by several heterogeneous applications working together simultaneously but located on various machines. A benefit of this embodiment is that the centralized management systems represent, among others, processes that require several multi-threaded parallel executions.

Additionally, in one embodiment even a single process flow may be broken down into multiple components and linked in sequence with each component performing a discreet task. For example, a chain of events following an order entry may include, in sequence, locating the ordered goods by the inventory system, acceptance of the order by the sales department, generation of billing invoices from accounting, and shipping of the goods by the shipping department. A benefit of this embodiment is that the engineer may simplify the planning stage by graphically viewing the process as a chain of activities to be performed by each department, as opposed to planning through the lens of computer code or script writing where the activities to be performed are guided by the capabilities and limitations of the computer language.

Moreover, because the execution process may be modularized in graphic form, additions may be easily integrated by restructuring the modules. For example, in the chain of activities after receiving an order, if a credit check is necessitated after locating the ordered goods in the inventory, then a module for the credit check may be graphically added between the appropriate sequences. The system engineer does not have to rewrite the code.

One embodiment may also permit the components to be reused. Once a process has been modularized, it may be used later to integrate other systems. For example, in a single transaction requiring two message translations, an incoming application message format may be translated into a database format and then translated from the database format into an outbound application format. The two message translations may be written as two distinct sequential components. Once developed, the first component, namely the incoming message translation, may be reused for another implementation having the same incoming requirements, but needing a different outbound format. A benefit of this embodiment is that the integration process may be streamlined and customized as there are no limitations on how many times components may be reused or combined.

The centralized management system may also implement changes to the distributed components. These changes may include updates to configuration information maintained by the central management system to keep track of the components. Because changes in business process activities happen on a daily basis, implementing changes for distributed systems may be a daunting task if the changes have to be made in various locations. By providing a central configuration registry, the integration engineer may manage and configure a large number of components in a single location. A benefit of this embodiment is that the engineer may disseminate the component changes or alerts in a single action seamlessly across the affected components.

One embodiment also supports an environment of disparate applications that need to work together. A typical enterprise may deploy various computing technologies and systems that are hosted on different platforms to support their business needs. Often, these systems need to share information, but require integration tools to do so. The centralized management system may provide modules that may be configured to interface with these disparate applications. The system also has the flexibility to provide other modules that embody the business processes transpiring among the applications. A benefit of this embodiment that the centralized management system provides for the seamless exchange of information and data in support of operations of the enterprise.

In one embodiment, the centralized management system may be scalable and may support the growth of an enterprise. Modularized components may be added in the network to support more computing systems, and as the data throughput requirement increases due to business growth, modularized components may be strategically added to speed transactions. A benefit of this embodiment is that, once in place, the central management system does not have to be replaced in order to accommodate business growth.

In one embodiment, the centralized management system is fault tolerant. The registry service may be separated from the run-time collaboration services. If the registry machine fails during operations, the components not running in the same machine may continue to run processing transactions as required by the business operation. Additionally, because the modules are distributed and run independently, if one component stops working, other components in the centralized management system may not be affected. Furthermore, the central registry system may be configured to route tasks from the failing component to a working component.

Another benefit of this embodiment is that updates and fixes to the centralized management system may be made without disrupting the entire system. For example, the centralized management system may stop the execution of one message queue in order to perform updates without affecting other components and without having to shut down the entire business. Thus, the centralized management system keeps working even when individual components are taken off-line.

FIG. 1 illustrates an example application integration system wherein a centralized management system 110 facilitates communication between application A 120 and application B 130 via a communications medium 140. The centralized management system 110 includes a central registry system 112, an application interface A 114, and an application interface B 116, wherein the central registry system 112 is implemented on a first computer 150, an application interface A 114 communicating with application A 120 both implemented on a second computer 160, and an application interface A 116 communicating with application B 130 both implemented on a third computer 170.

In one embodiment, application A 120 and application B 130 may include a variety of systems, such as, for example, legacy applications, databases, Enterprise Resource Planning ("ERP") applications (e.g., SAP R/3), Object Request Brokers ("ORBs") (e.g., IONA Technology's ORBIX), Internet applications, Electronic Data Interchange ("EDI") network applications (e.g., SAP EDI), and so forth.

In the embodiment depicted in FIG. 1, the central registry system 112, application interface A 114, and application interface A 116 are implemented as separate components connected via a communications medium 140. It is recognized that in other embodiments, the central registry system 112 and application interface A 114 may be implemented as part of a single component or the central registry system 112 and application interface A 116 may be implemented as part of a single component. Furthermore, while the application interface A 114 is depicted as being implemented as part of application A, it is recognized that in other embodiments, the application interface A 114 and application A 120 may be implemented as separate components as is similarly recognized for application interface B 116 and application B 130.

Furthermore, while FIG. 1 illustrates two applications and two application interfaces, it is recognized that more than two applications and/or application interfaces may be included.

In one embodiment, the centralized management system 110 includes a central registry system 112. The central registry system 112 may control the storage and dynamic distribution of system configuration information, system processes, monitoring access control, selective load balancing, and selective forwarding of data. For example, data may be selectively forwarded to provide alert notification (e.g., Warning, High Priority, Extreme Emergency) to various recipients via various delivery channels (e.g., via e-mail, pager, fax). In one embodiment, the central registry system 112 may alert various components as to when to apply load balancing techniques wherein the components may, for example, use subscriber pooling to decrease overall queuing time and increase data throughput. As discussed above, in one embodiment, the central registry system 112 resides on its own computing device while in other embodiments, the central registry system 112 resides with one or more of the applications.

The computing device may be a device which allows a user to interact with the central registry system 112 or a device that can run an application. In one embodiment, the computing device is a conventional general purpose computer using one or more microprocessors, such as, for example, a Pentium processor, a Pentium II processor, a Pentium Pro processor, a Pentium III processor, and Athena processor, an xx86 processor, an 8051 processor, a RISC processor, a MIPS processor, a Power PC processor, or an Alpha processor. In one embodiment, the computing device runs an appropriate operating system, such as, for example, Microsoft® Windows® 2000, Microsoft® Windows® 3.X, Microsoft® Windows 98, Microsoft® Windows® NT, Microsoft® Windows® CE, Palm Pilot OS, Apple® MacOS®, Disk Operating System (DOS), IBM® OS/2®, IBM RS/6000 AIX®, Hewlett-Packard HP-UX®, UNIX, Linux®, SunOS®, or Solaris OS® operating systems. In one embodiment, the computing device is equipped with a conventional modem or other network connectivity such as, for example, Ethernet (IEEE 802.3), Token Ring (IEEE 802.5), Fiber Distributed Datalink Interface (FDDI), or Asynchronous Transfer Mode (ATM). As is conventional, in one embodiment, the operating system includes a TCP/IP stack which handles all incoming and outgoing message traffic passed over the communications medium 140.

In other embodiments, the computing device may, for example, be a computer workstation, a local area network of individual computers, an interactive television, an interactive kiosk, a personal digital assistant, an interactive wireless communications device, a handheld computer, a telephone, a router, a satellite, a smart card, an embedded computing device, or the like which can interact with the communication medium. While in such systems, the operating systems will differ, they will continue to provide the appropriate communications protocols needed to establish communication links with the communications medium 140.

Figure 2:
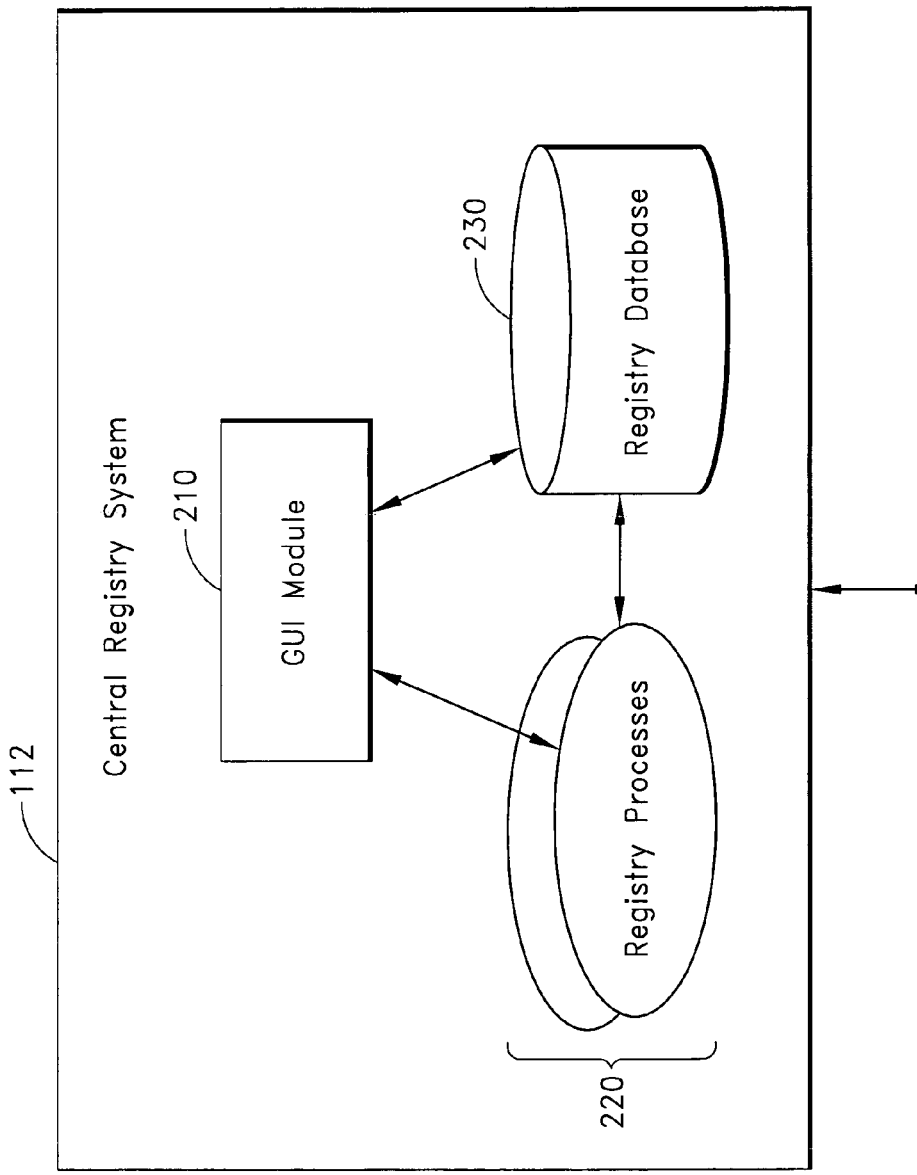
FIG. 2 illustrates a high-level block diagram of one embodiment of the central registry system.

FIG. 2 illustrates a central registry system 112 that includes a graphical user interface ("GUI") module 210, a collection of registry processes 220, and a registry database 230.

In one embodiment, the central registry system 112 includes a GUI module 210. The GUI module 210 allows users to interact with the centralized management system 110 to perform tasks, such as, enter configuration information, set timing information, input data translation information, represent business process flow information, and so forth. The GUI module 210 may include, for example, a business process modeling tool, a business process rule creation tool, a system monitoring tool, a system alert tool, a registry database tool, as well as other interface tools. In one embodiment, a user may use the business process modeling tool of the GUI module 210 to create a graphical representation of a business process that shows how he wants his applications to communicate. A user may also use the business process rule creation tool to set rules and functions for how the applications are to communicate.

The GUI module 210 may be implemented as a software program that uses text, graphics, audio, video and other media to present data and to allow interaction with the data. A GUI module 210 may be a combination of an all points addressable display such as a cathode-ray tube (CRT), a liquid crystal display (LCD), a plasma display, or other types and/or combinations of displays; input devices such as, for examples, a mouse, trackball, touch screen, pen, keyboard, voice recognition module, and so forth; and software with the appropriate interfaces which allow a user to access data through the use of stylized screen elements such as, for example, menus, windows, toolbars, controls (e.g., radio buttons, check boxes, sliding scales, etc.), and so forth.

While the exemplary centralized management system 110 includes a GUI module 210, it is recognized that in other embodiments, other modules may be used in connection with or independent of the GUI module 210. For example, the centralized management system 110 may interact with users by accepting text-based entry of information as well as imported sets of data.

As used herein, the word module, whether in upper or lower case letters, refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

In one embodiment, the central registry system 112 includes a collection of registry processes 220. The registry processes 220 perform various tasks for the central registry system 112, such as, for example, handling requests for configuration updates, processing changes to the content in the registry database, and forwarding of updates to the appropriate components. In one embodiment, the registry processes 220 may be implemented as multithreaded programs wherein more than one registry process may be running simultaneously and duplicate copies of a single process may also be running. For more information on the registry processes 220, see the section below.

In one embodiment, the central registry system 112 includes a registry database 230. The registry database 230 stores the configuration details of the system. This information may include: information about the participating host, the users, the control brokers, the monitors, the modules, the application interfaces, the application queues, event types, rules, processes, services, as well as other system components.

In one embodiment, the participating host information may include host name, network name or IP address, network domain name, control broker name, and so forth. Further, application interface information may include IQ name, service, behavior, publishing module, event type, clean up schedule, manager name, and so forth. Module information may include module name, participating host, control broker, module type, file name, configuration file name, arguments for various commands, and so forth. In addition, module information may also include user information, whether or not the module should start automatically, whether auto restart should be enabled, start schedule, stop schedule, log level, debugging flags, whether or not to use a log file, IQ manager, TCP/IP port, and so forth. While the above examples provide one embodiment of information that may be stored in the central registry, it is recognized that other embodiments, additional or subsets of the above-described information may be included in the central registry.

Figure 3A:
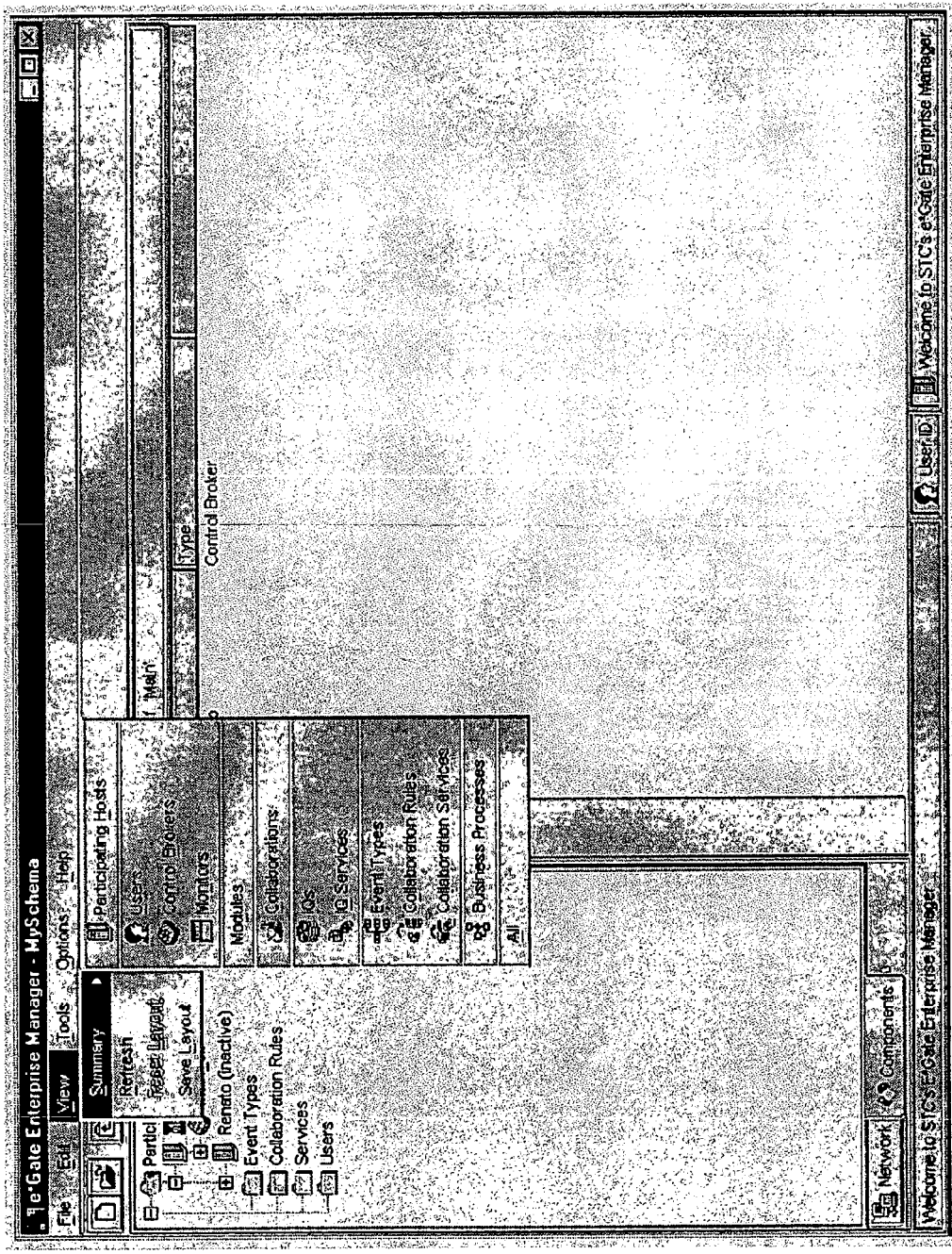
FIG. 3A illustrates a screen shot of one embodiment of a central registry GUI.
Figure 3B:
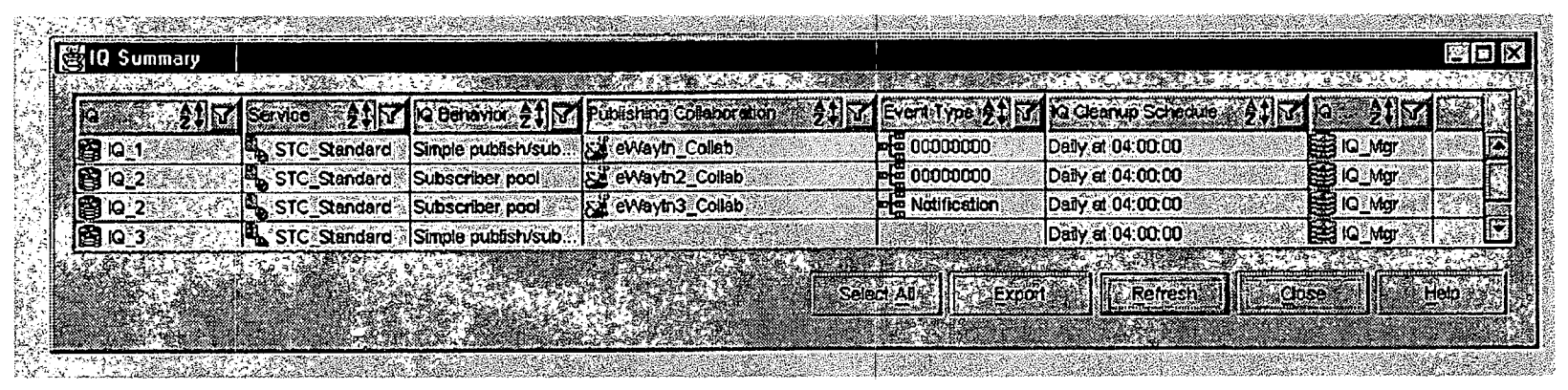
Figure 3C:
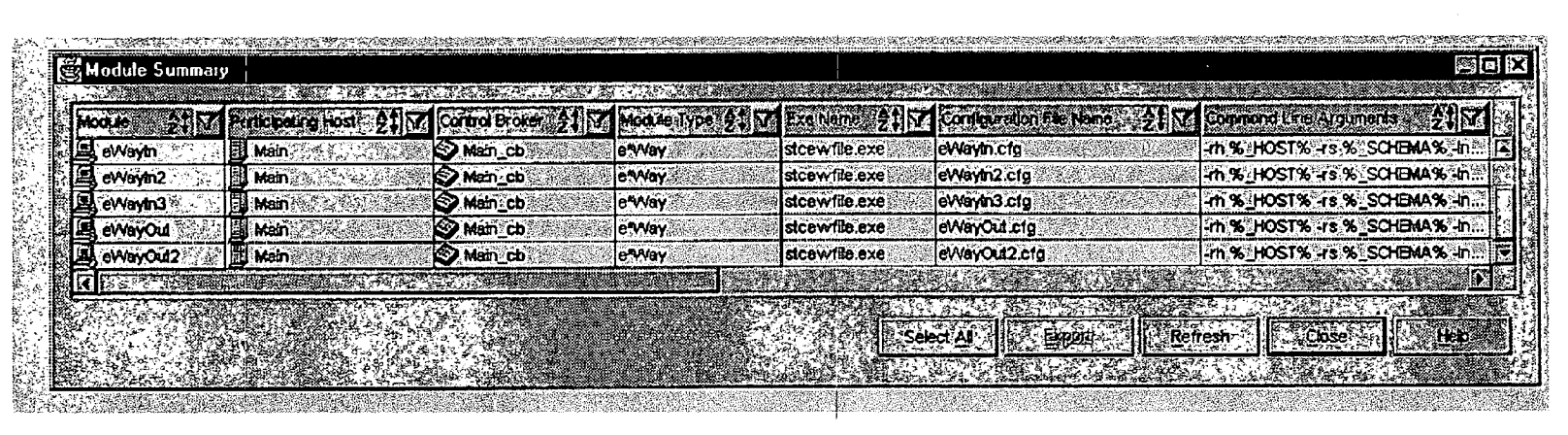

In one embodiment, the registry database 230 may be accessed via a registry database tool in the GUI module 210. The properties of each component may be displayed as the user selects the component via a menu. Sample screen shots from one embodiment of a registry database tool are shown in FIGS. 3A, 3B, and 3C. In the left window of FIG. 3A, the groups of various components are displayed allowing a user to select a component. This selection may be for an individual type, such as control brokers, interface queues, participating hosts, interface modules, and so forth. In one embodiment, an administrator may display all components by selecting the "ALL" option. In FIG. 3B, participating host information is displayed in a table format. In FIG. 3C, interface information is displayed in table format as well. While the exemplary registry database module displays information in table format, it is recognized that other embodiments, other formats and other tools may be used.

Further, in other embodiments, the central registry information may also be accessed using a command-line environment in addition to or instead of the above-described GUI module 210.

In one embodiment, the registry database 230 is implemented as a flat file. It is recognized that in other embodiments, the registry database 230 may be implemented using a relational database, such as Sybase, Oracle, Microsoft® SQL Server, or Times10, as well as other types of databases (such as an object-oriented database). Moreover, while the registry database 230 depicted in FIG. 2 is comprised of a single database, it is recognized that in other embodiments, the registry database 230 may be implemented as a collection of databases, as a set of tables or as other data structures that are well know in the art such as linked lists, binary trees, and so forth.

While FIG. 1 illustrates a centralized management system 110 that includes a central registry system 112, it is recognized that in other embodiments, the centralized management system 110 may include multiple instances of the central registry information.

In one embodiment, the central registry system 112 may be implemented in a hierarchical manner and include a master registry and multiple subordinate registries. Changes may be sent to the master registry such that the master registry propagates the appropriate information to the corresponding subordinate registries. This embodiment allows the centralized management system 110 to continue working even if the master registry goes down as a copy of the configuration information in the master registry has been distributed to the subordinate registries. Techniques well known in the art may be used to ensure data integrity among the master registry and the multiple subordinate registries.

In another embodiment, the central registry system 112 may be implemented in a non-hierarchical form and may include several duplicate registries. Changes may be sent to a designated registry and the designated registry may propagate the changes to the other registries or changes may be sent to any of the registries such that each registry knows to send the changes to the other registries. Techniques well known in the art may be used to ensure data integrity among the duplicate registries.

In one embodiment, the centralized management system 110 includes a collection of application interfaces. The application interfaces facilitate communication between the application and the central registry system 112 as well as among the application and the other applications in the application integration system. In one embodiment, the application interface may be different for each application in the application integration system and may include different components depending on how the user wants the applications to communicate.

Figure 4:
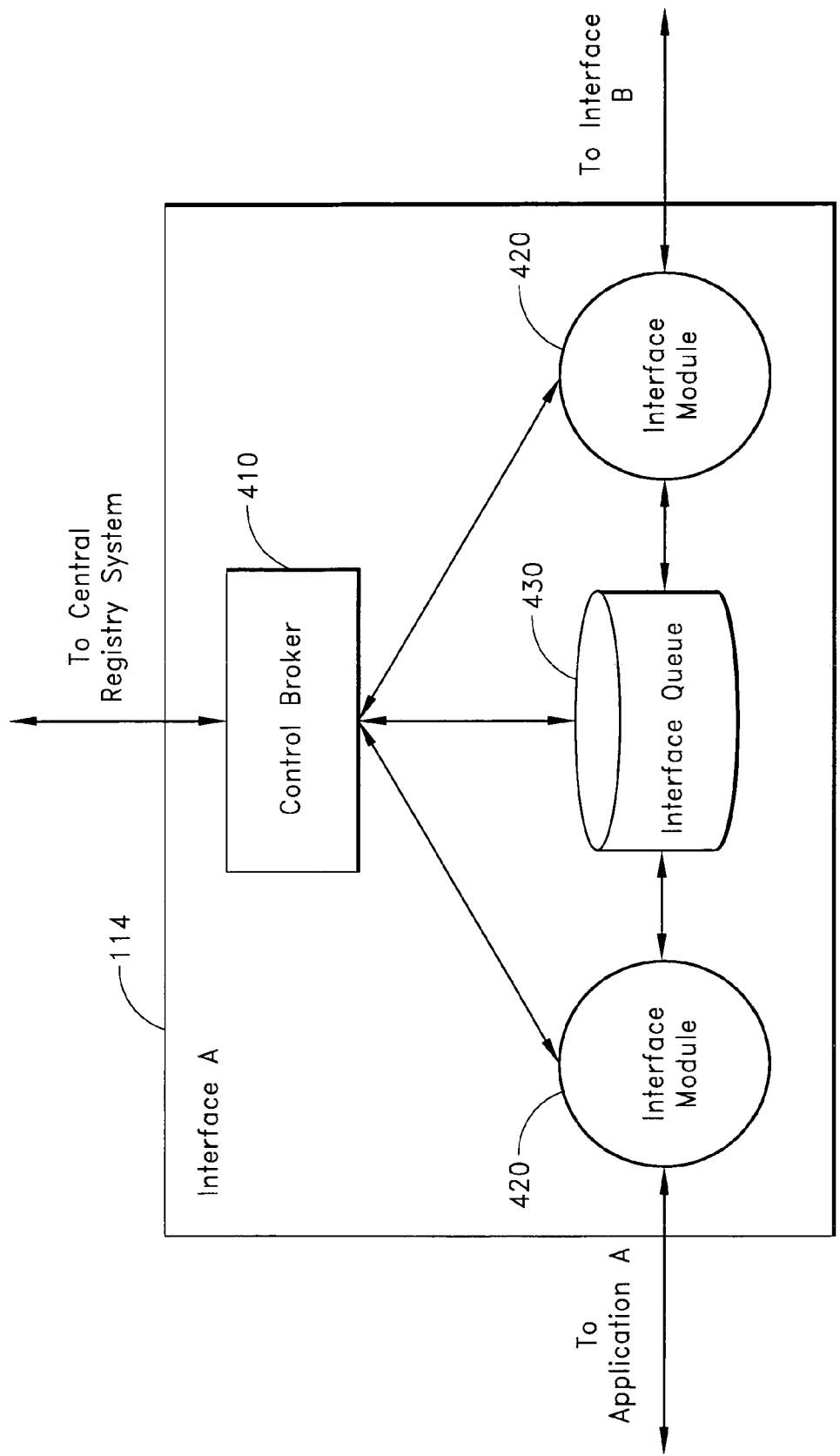
FIG. 4 illustrates a high-level block diagram of one embodiment of an application interface.

FIG. 4 illustrates one embodiment of an interface that has been configured to communicate with application A 120 and interface B 116. Interface A 114 includes a control broker 410 that communicates with two interface modules 420, an interface queue 430, as well as the central registry system 112. In operation, a component, such as an interface queue 430, may send an update request to the control broker 410 who then forwards the request to the central registry system 112. The central registry system 112 may then send the appropriate update information to the control broker 410 or the central registry system 112 may contact the component directly.

In one embodiment, the application interface includes a control broker 410. The control brokers 410 maintain local configuration information for their corresponding applications. For example, the control broker 410 may process configuration changes and configuration change requests, facilitate communication among the central registry system 112 and the components, track the status of the components, manage component alerts, perform local maintenance events, as well other basic maintenance and administrative actions. For example, the control broker 410 may communicate with the central registry system 112 to allow the local configuration to be synchronized with the central registry system 112, such as, for example, by performing, requesting, or responding to updates when changes occur in the central registry system 112 and a central monitor system. In addition, the control broker 410 may communicate with a central monitor system that allow for the monitoring of the distributed components. A detailed description of one embodiment of a central monitor system is disclosed in U.S. Application No. 60/192,523, filed Mar. 28, 2000, entitled "SYSTEMS AND METHODS FOR ANALYZING BUSINESS PROCESSES," which is incorporated herein by reference. In one embodiment, the control broker 410 communicates with the central registry system 112 via TCP/IP communication. It is recognized, however, that other communications mediums may be used.

In one embodiment, each control broker 410 is associated with a single application and the control broker 410 resides with the application. For example, the control broker 410 depicted in FIG. 4 is associated with application A 120 and resides with application A. In other embodiments, a control broker 410 may be associated with more than one application and may reside with any of the associated applications or the control broker 410 may reside on an independent device.

Figure 5A:
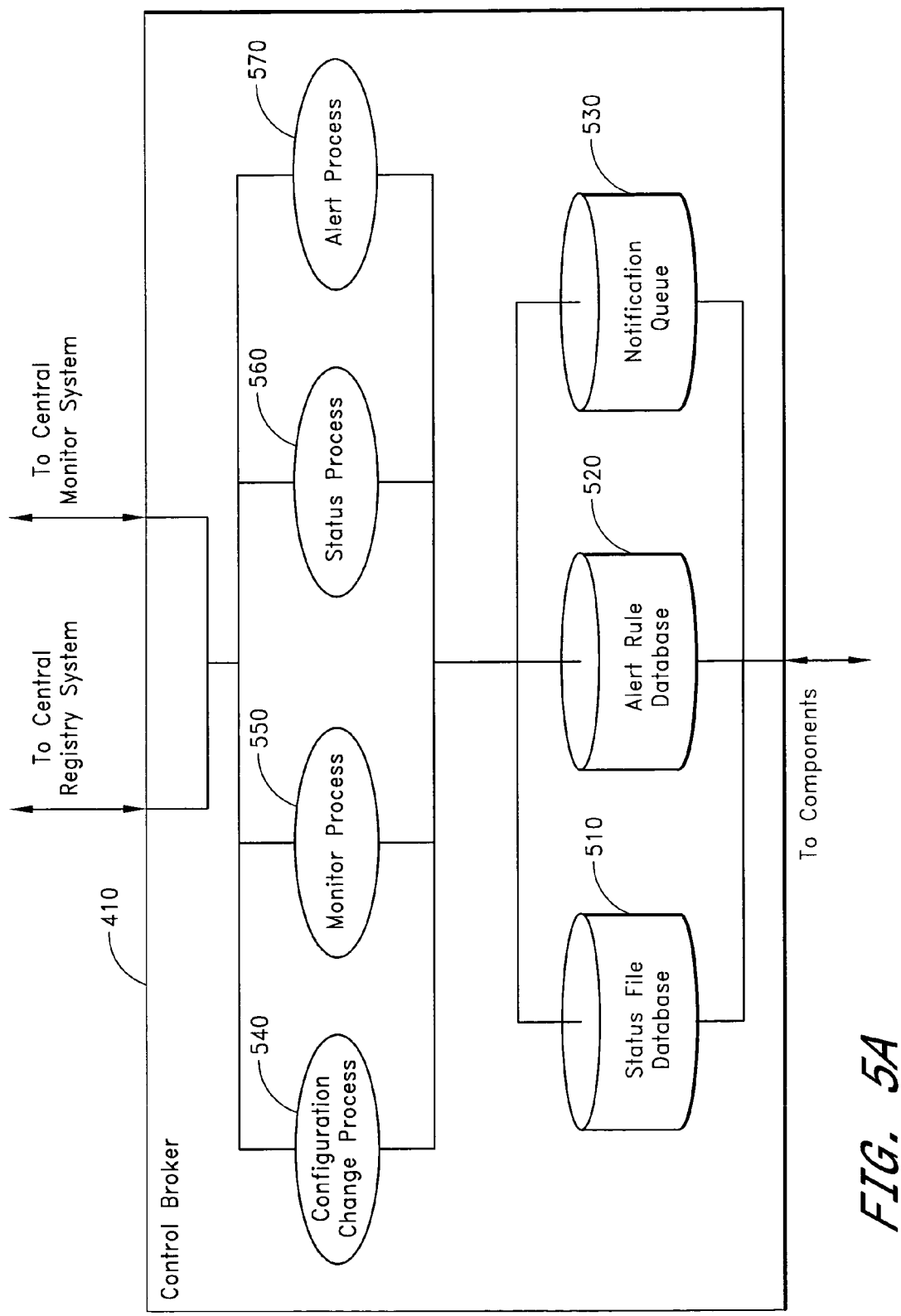
FIG. 5A illustrates a high-level block diagram of one embodiment of a control broker.

FIG. 5A illustrates one embodiment of a control broker 410. The control broker 410 includes a status file database 510, an alert rule database 520, a notification queue 530, a configuration change process 540, a monitor process 550, a status process 560, and an alert process 570. In addition, the control broker 410 communicates with a central registry system, a central monitor system and/or various components (e.g., application interfaces, application queues, and so forth).

The status file database 510 includes information about the status of the components. As components are updated, the control broker 410 may update the components' corresponding file such that the file may reflect the current status of the component. In other embodiments, the status file database 510 may be updated on a periodic basis, (e.g., hourly, daily, weekly, etc.) such that the status file database 510 reflects the status of the component at the time of the last update. Furthermore, in other embodiments, the status file database 510 may be located outside of the control broker 410 as illustrated in FIG. 5B.

The alert rule database 520 includes information on what actions the control broker 410 should take when it receives an alert. The rules database may include standard rules, user-defined rules, and so forth, and/or information about who, if anyone, should be notified, and how the notification should occur. For example, if an application queue completely shuts down, then the rule may be to notify the system administrator by pager, the design manager by e-mail, and a nearby application queue by an alert command using the monitor process 550 discussed below. In other embodiments, the alert rule database 520 may be located outside of the control broker 410 as illustrated in FIG. 5B.

The notification queue 530 includes messages about the alerts that occur and/or information about the persons and or components that were notified about the alerts. In one embodiment, the notification queue 530 is located within the control broker 410, however, in other embodiments, the notification queue 530 may be located outside the control broker 410 in order to save the alert messages in case the control broker 410 shuts down for an emergency as illustrated in FIG. 5B.

Figure 5B:
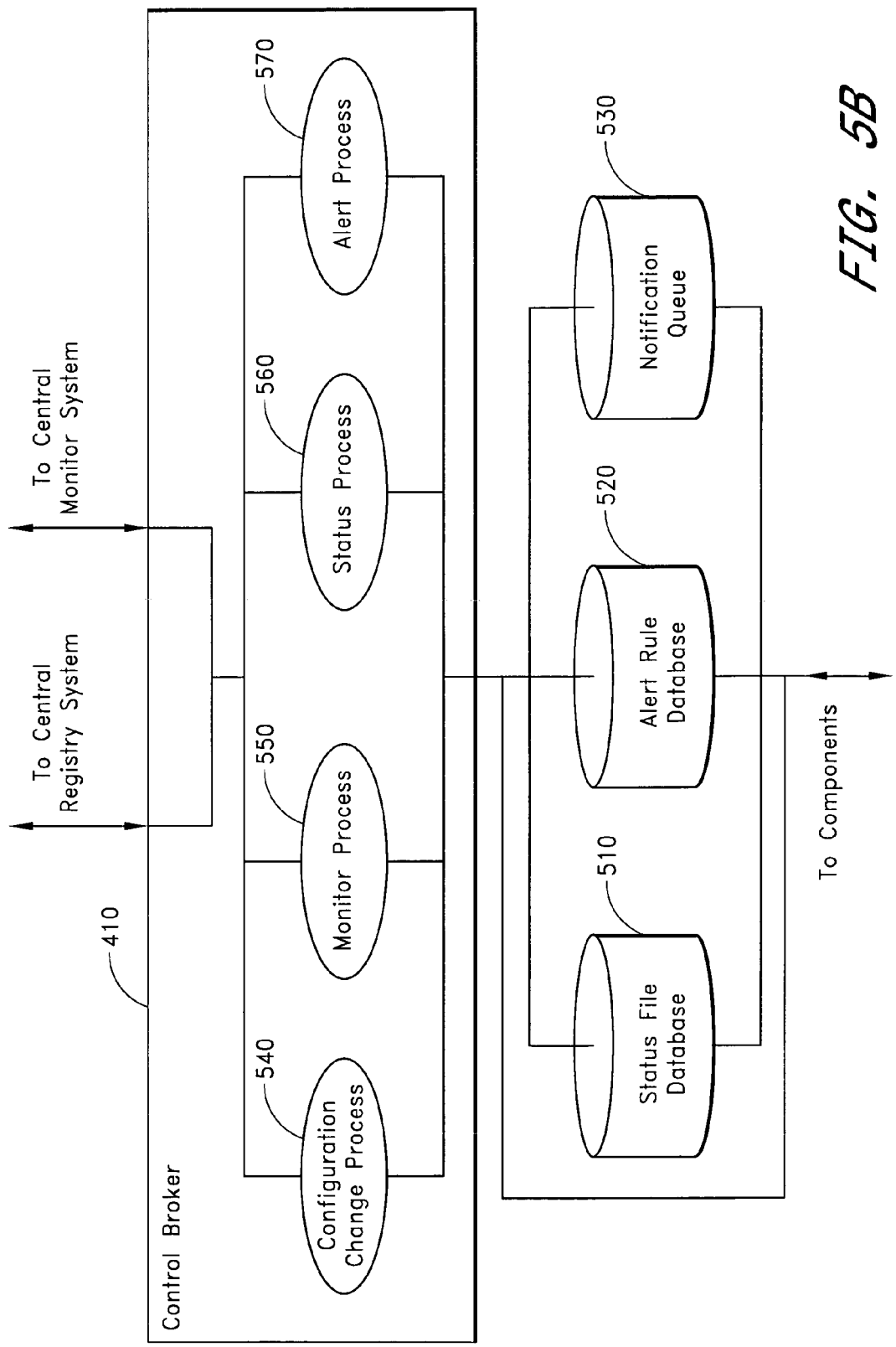
FIG. 5B illustrates a high-level block diagram of an additional embodiment of a control broker.

While FIG. 5B illustrates the status file database 510, the alert rule database 520, and the notification queue 530 as all being outside of the control broker 410, it is recognized that in other embodiments, one or two of the components may be located outside of the control broker 410.

In one embodiment, the notification queue 530, the alert rule database 520, and the status file database 510 are implemented as flat file databases. It is recognized that in other embodiments, the notification queue 530, the alert rule database 520, and the status file database 510 may be implemented using other data structures that are well known in the art, such as a database, a linked list, a queue, and so forth. Further, it is recognized that the notification queue 530, the alert rule database 520, and the status file database 510 may be implemented as separate modules using different and/or the same data structures.

The control broker 410 processes may run one at a time or they may run at the same time as other processes. As discussed above, the control broker 410 processes include a configuration change process 540, a monitor process 550, a status process 560, and an alert process 570.

The control broker 410 may include a configuration change process 540 to receive and send configuration information to and from the central registry and to and from the various components. When the control broker 410 starts up, the configuration change process 540 may make a request to the central registry system to receive its configuration information. In addition, the configuration change process 540 may maintain a periodic connection between the control broker 410 and the central registry to monitor whether the central registry has any configuration changes for the components. In one embodiment, the configuration change process 540 contacts the central registry on a periodic basis, such as, for example, every minute, every hour, every twelve hours, every day, and so forth. In other embodiments, however, the configuration change process 540 may receive a message from the central registry when the central registry has configuration changes for the components. In addition, the configuration change process 540 may connect the control broker 410 to the central registry, such as when its workload is below a minimum threshold. It is also recognized that a combination of the above may also be used. After the configuration change process 540 recognizes that the central registry has configuration changes for at least one of the components, the configuration change process 540 may then contact the component to instruct the component to contact the central registry to retrieve the configuration changes. In other embodiments, the configuration change process 540 may retrieve the configuration changes and forward them to appropriate components.

The control broker 410 may also include a monitor process 550 that provides information for monitoring the system and/or issues commands to the various components. These commands may include, for example, determination of a component version number, start/shut down commands, and so forth and may be sent to the components via the control broker 410. In addition, the components may send its response or reply to the control broker 410, such as, for example the component's version number, the flag for a down connection, the flag for a failed state, and so forth.

The control broker 410 may include a status process 560 for receiving status information about the components and storing the status information in a status file database 510. In other embodiments, the status information may be forwarded to a status file database 510 located outside the control broker 410 or to another component. In addition; the status process 560 may forward status information to the central registry system and/or the central monitor system.

The control broker 410 may also include an alert process 570 that warns the system about possible volatile situations, such as, an application interface that has stopped responding or an application queue that has reached maximum capacity. When such conditions occur, the components send an alert to the control broker 410. The alert is then processed by the alert process 570. The alert process 570 may retrieve instructions from the alert rule database 520 to determine how the alert should be handled. As discussed above, the alert rule database 520 includes a collection of rules, business logic, or configured specifications on how to handle various alerts, who, if anyone, should be notified, and/or how the notification should occur. After the alert process 570 determines how to handle the alert, the alert process 570 may then forward the alert to the appropriate party, the central registry system, the central monitor system, and/or the notification queue 530. The alert process 570 may then wait for the alert to be resolved.

The alerts may be resolved manually through the central monitor system, by the system administrator, or by an alert resolution process. If the alert is properly resolved, the system administrator will mark the component as resolved, and the alert process 570 will receive the alert's new status from the central monitor system. The alert process 570 may then update the alert's status in the notification queue 530. If the alert is not properly resolved, then the alert process 570 sends a message to the notification queue 530, the central registry system, and/or the central monitor system to inquire about the unresolved status.

In one embodiment, the application interface includes interface modules 420. The interface modules 420 establish connectivity among the applications and the centralized management components. The interface modules 420 are thus able to interact with a variety of different applications and different types of applications using the appropriate protocols. The interface modules 420 may manage various application communication details, such as, for example, rules for responding to acknowledgements, rules for generating acknowledgements, re-send criteria, reconnect criteria, timeout logic, data parsing, data reformatting, buffer size, retrieval schedules, transmission schedules, error management, as well as other communication details.

In one embodiment, the centralized management system 110 uses a variety of interface modules 420 including standard interface modules 420 configured to communicate with standard applications, custom interface modules 420 configured to communicate with a non-standard application, modified standard interface modules 420 configured to communicate with altered standard interface modules 420, as well as internal interface modules 420 configured to communicate with other components, such as, other interface modules 420, interface queues 430, and so forth.

In one embodiment, the application interface includes an interface queue 430. The interface queues 430 provide reliable interprocess communication among the application interfaces. Information may be sent from one application to another via a network of application interfaces and interface queues 430 wherein the user may create rules pertaining to how the information is to be read, translated, formatted, and sent; when the information is to be processed; when the information is to be sent; who has access to the information; and so forth. The interface queues 430 allow for the queuing of various messages to ensure that the data is sent in a timely and secure manner. In addition, the interface queues 430 may help provide message recovery after system failure.

The exemplary interface queues 430 may be implemented as stand alone data store components or they may be implemented using standard databases such as, for example, Sybase, Oracle, MQ, and so forth. For a more detailed discussion an optional implementation of the interface queues, please refer to the U.S. Provisional Patent Application No. 60/162,927 entitled "SYSTEM AND METHOD OF INTELLIGENT QUEUING," filed Nov. 1, 1999, which is incorporated herein by reference. In addition, a detailed description of one embodiment of the interface queues is disclosed in a concurrently filed application having the title "SYSTEMS AND METHODS OF MESSAGE QUEUING," internal reference number SOFTECP.013A, which is incorporated herein by reference.

In one embodiment, the centralized management system 110 includes a communications medium 140. The communications medium 140 provides for communication among the application interfaces and the central registry system 112. In one embodiment, the communications medium 140 is implemented as an Internet Protocol network running Transfer Control Protocol/Internet protocol (TCP/IP) service to route messages to routing hubs connected to one or more other routing hubs via high speed communication links.

It is recognized, however, that the communications medium 140 may be comprised of one or more interactive mediums. For example, the communication medium may include an Ethernet network, interactive television networks, telephone networks, wireless data transmission systems, two-way cable systems, customized computer networks, interactive kiosk networks, Internet satellite transmissions, automatic teller machine networks, and/or the like. Furthermore, in one embodiment, the communications medium 140 may include direct connections among the various components.

In one embodiment, the central registry system 112 includes a collection of registry processes 220. The registry processes 220 perform various tasks for the central registry system 112, such as, for example, handling requests for configuration updates, processing changes to the content in the registry database 230, and forwarding of updates to the appropriate components. In one embodiment, the registry processes 220 include a distribute configuration change process and a configuration update request process as well as other process.

Figure 6:
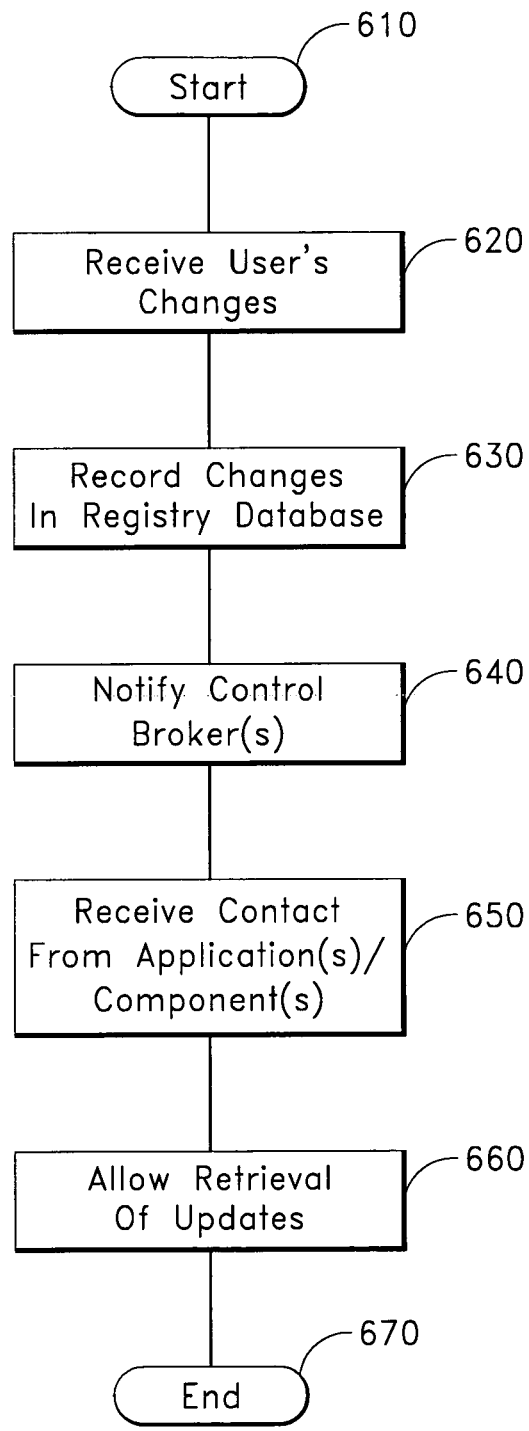
FIG. 6 illustrates a flowchart of one embodiment of a configuration change process.

FIG. 6 illustrates one embodiment of a distribute configuration change process wherein a user, such as an administrator, enters configuration changes via the GUI module 210. The configuration changes may, for example, alter the business process model implemented in the application interface system or change how messages are to be from one application to a second application.

Beginning at a start state (block 610), the configuration change process receives the user's changes (block 620). Next, the configuration change process records the changes in the registry database 230 (block 630) and notifies the appropriate control brokers 410 that there are configuration changes to be implemented (block 640). The control brokers 410 alert the applicable applications or components of the notification such that the appropriate object contacts the central registry system 112 to retrieve the updates (block 650). Finally, the updates are retrieved by the application or component (block 660).

It is recognized that FIG. 6 represents one embodiment of a distribute configuration change process and that the configuration change process may be implemented in a different manner. For example, the central registry system 112 may contact the object directly and send the object the appropriate changes. In another embodiment, the central registry system 112 may forward the changes to the appropriate control broker 410 such that the control broker 410 then forwards the changes to the appropriate object.

Figure 7:
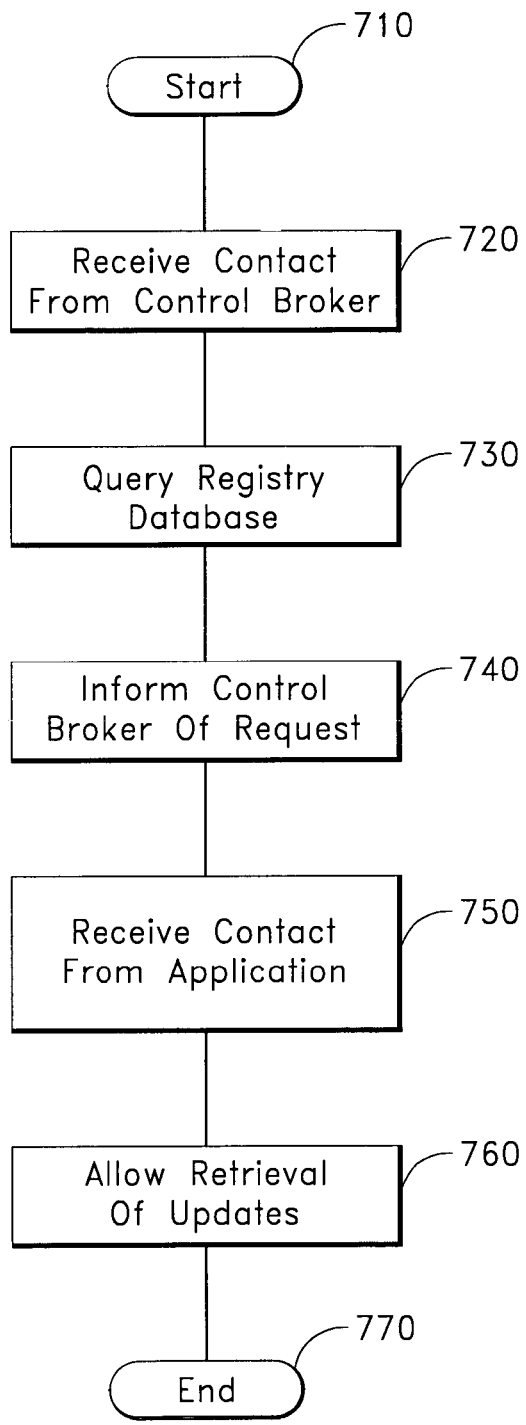
FIG. 7 illustrates a flowchart of one embodiment of a configuration update request process.

FIG. 7 illustrates one embodiment of a configuration update request process wherein an application makes a configuration update request. It is recognized that in other embodiments, other components, such as for example, interface modules 420, interface queues 430, control brokers 410, and so forth, may also make configuration update requests.

Beginning at a start state (block 710), the central registry system 112 receives contact from the control broker 410 corresponding to the application requesting the update (block 720). Next, the configuration update request process queries the registry database 230 to determine what update information, if any, should be sent to the application (block 730). Next, the control broker 410 informs the application that a configuration update request has been sent (block 740) triggering the application to contact the central registry system 112 (block 750). Finally, the updates are retrieved by the application (block 760).

It is recognized that FIG. 7 represents one embodiment of a configuration update request process and that the configuration update request process may be implemented in a different manner. For example, the object may contact the central registry system 112 directly to send update requests. In another embodiment, the central registry system 112 may forward the updates to the appropriate control broker 410 such that the control broker 410 then forwards the updates to the appropriate object. In an additional embodiment, the central registry system 112 may automatically update the objects without waiting for update requests.

It is contemplated that the invention may be used for a variety of applications. For example, the centralized management system 110 may be used to connect a supplier application, an inventory application, and a bank application as illustrated in the application integration system depicted in FIG. 8. For example, the centralized management system 110 may be configured to first obtain a purchase order from the supplier application, check the inventory application to see if the parts are available, and then debit the appropriate amount from the customer's account via the bank application.

Figures 8, 8A, 8B:
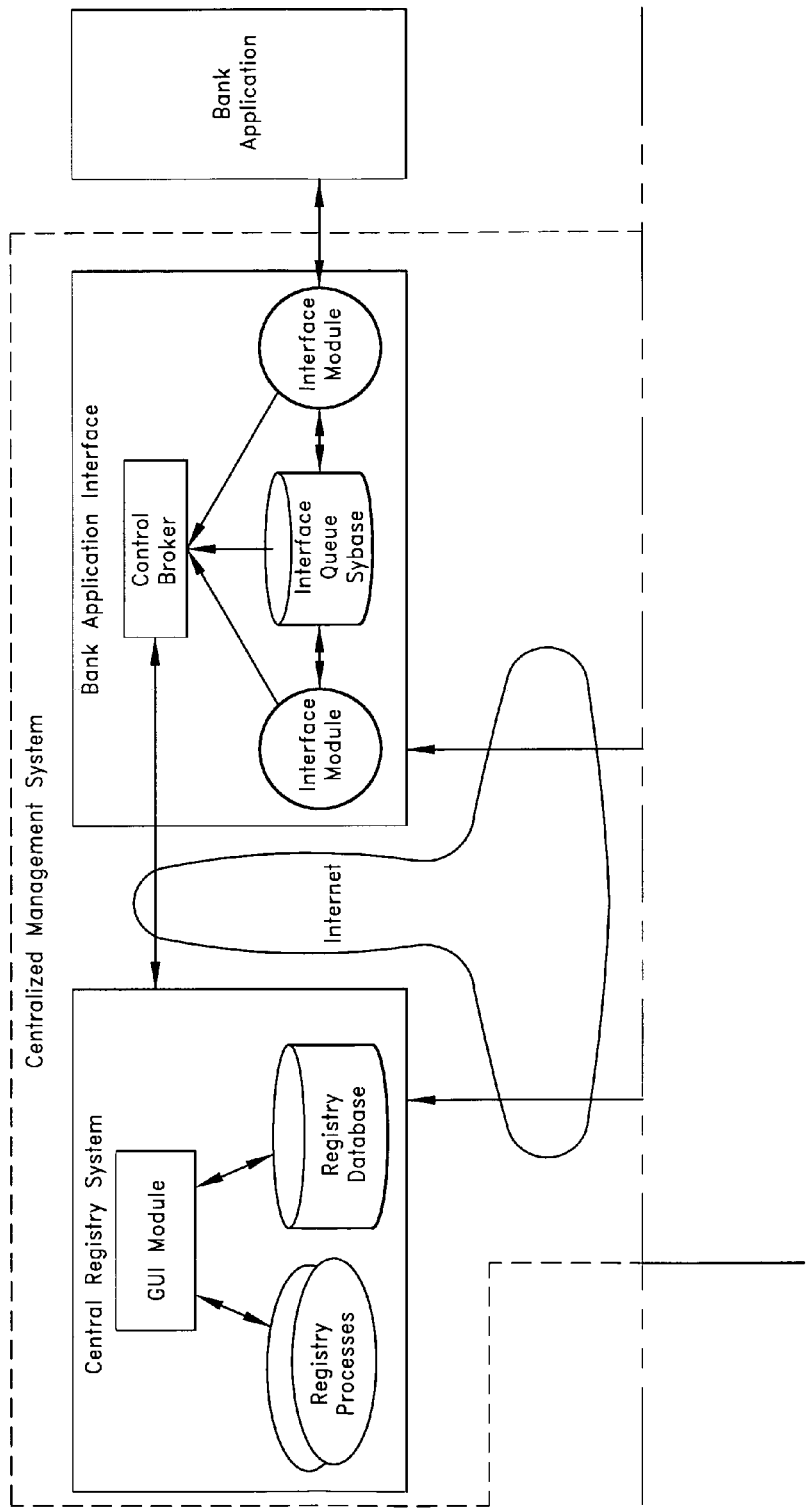
FIG. 8 illustrates a high-level block diagram of an additional embodiment of application integration system that includes a centralized management system.
Figure 8B:
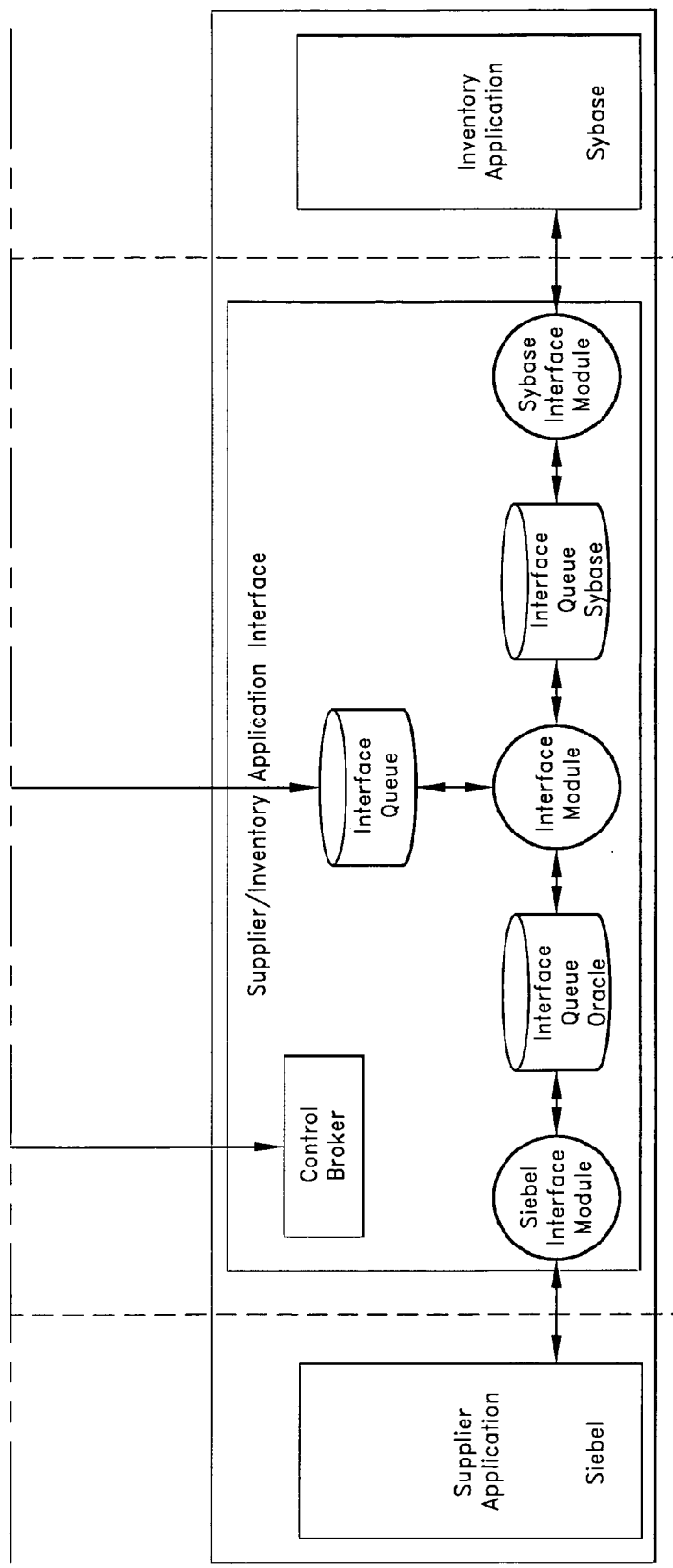

The centralized management system 110 depicted in FIG. 8 is implemented such that the central registry system 112 is located on its own computing device, the Supplier/Inventory application interface communicates with the Supplier Application and the Inventory Application, and they all reside together; whereas the Bank application interface communicates with the Bank application and each resides on its own computing device. The Supplier application communicates with the Inventory application via the Supplier/Inventory application interface and the Supplier application and Inventory application communicate with the Bank application via the Bank application interface.

Furthermore, the Bank application interface includes an interface queue that is implemented using Sybase, while the Supplier/Inventory application interface includes interface queues implemented using Oracle and Sybase. In addition, the exemplary Supplier application is a Siebel application and thus communicates with a Siebel interface module; and the Inventory application is a Sybase application that communicates with a Sybase interface module.

It is recognized that the applications, interface modules, and interface queue may be implemented using a variety of products and that the example is provided to illustrate the flexibility and scalability of the centralized management system 110 and not to limit the scope of the protection. In other embodiments, the applications may be implemented using a variety of systems, such as, for example, legacy applications, databases, ERP applications, ORBs, Internet applications, EDI network applications, and so forth.

A user may make a change to the configuration of the application integration system using the GUI module 210 to input the configuration changes. For example, the user may want to change the rules for converting a supplier record into an inventory record. Table 1 illustrates a sample supplier record and Table 2 illustrates a sample inventory record.

TABLE 1

| Part No. | Number |
|---|---|
| Last Name | Text |
| First Name | Text |
| Quantity | Number |
| Price | Money |

TABLE 2

| Part No. | Text |
|---|---|
| Name | Text |
| Number | Number |
| Cost | Money |

In one example, a user may have been using only the Last Name of the supplier record as the name in the inventory record and may want to change the configuration of the system to have the Name field of the inventory record include both the First Name and the Last Name of the supplier record. Thus, using the GUI module 210, the user may enter the configuration change that the inventory record Name field=the supplier record First Name field+the supplier record Last Name field.

After the user has entered the configuration changes, the central registry system 112 receives the configuration changes and stores the configuration changes in the registry database 230. Next, the central registry system 112 uses a registry process to determine which components need to receive the configuration changes. In the current example, the Supplier/Inventory application interface may receive the configuration changes and implement the new rule for constructing an Inventory record. Thus, the central registry system 112 contacts the control broker associated with the Supplier/Inventory application interface and notifies the control broker 410 of the change. Next, the control broker informs the appropriate interface module that there is a configuration change and the appropriate interface module contacts the central registry system 112 to retrieve the change.

Figure 9:
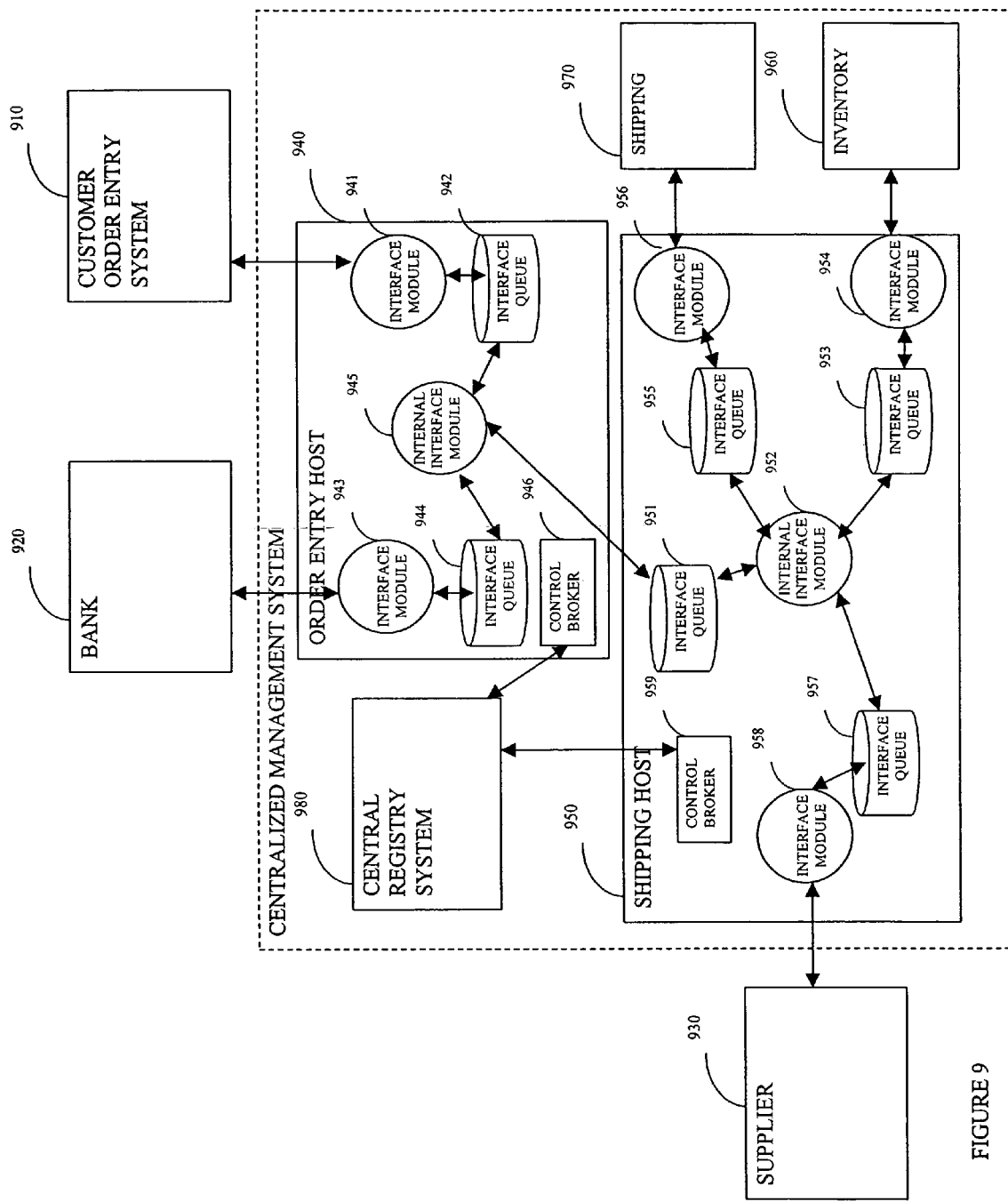
FIG. 9 illustrates a high-level block diagram of an additional embodiment of application integration system that includes a centralized management system.

FIG. 9 illustrates an additional embodiment of an application integration environment which includes external organizations, namely, a customer order entry system 910, a bank 920, and a supplier 930, that communicate via an order entry host 940 and a shipping host 950 wherein each of the external organizations and the hosts are implemented on different computing systems.

In the illustrated embodiment, a customer may send an order from the customer order entry system 910 to the order entry host 940. Information about the order, such as, for example, part number, catalog number, item description, and so forth, is received by the customer order entry system interface module 941 and published to an interface queue 942. Next, the customer may instruct his bank 920 to send down a payment for the order. The payment information is received by the bank interface module 943 and published to an interface queue 944. The internal interface module 944 for the order entry host then queries the intelligent queues 942, 944 to verify that there is an order and that the required payments have been received.

Assuming that there is an order with the required payment, an event is sent to one of the shipping host's 950 interface queues 951. The internal interface module 952 for the shipping host queries the interface queue 951 for incoming orders and processes the information accordingly. Next, the internal interface module 952 sends a query to the inventory application 960 via an interface queue 953 and an inventory interface module 954 to determine if the ordered item is in stock. If the item is in stock, the internal interface module 952 authorizes the shipping module 970, via an interface queue 955 and a shipping interface module 956, to ship the item. If the item is not in stock or if the quantity reaches a specified low-sock level, the internal interface module 952 may issue a purchase request to the supplier 930 via an interface queue 957 and a supplier interface module 958.

In one embodiment, the central registry system 980 centrally manage the order entry host 940 and the shipping host 950 via communication with the control broker 946 of the order entry host and the control broker 959 of the shipping host.

It is recognized that FIG. 9 illustrates one example application interface system and that in other embodiments, other systems may be used and/or added. for example, the system depicted in FIG. 9 may also include a finance host, a receiving host, a manufacturing host, and/or an engineering host. It is recognized that various embodiments of the invention may be used and that the example provided above is meant only to illustrate various uses of the invention and not to limit the scope of the invention.

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. An application collaboration system, comprising:
a central registry for maintaining configuration information for various components in the system, the configuration information comprising a first set of configuration information and a second set of configuration information; and
a first interface and a second interface, the first interface configured to communicate with a first application, and the second interface configured to communicate with a second application, wherein the first and second applications are not capable of communicating directly with each other, wherein the first and second interfaces are coupled to each other and to the central registry via a communications medium for enabling communication therebetween, wherein the first interface is operable to receive the first set of configuration information from the central registry and implement the first set of configuration information to operate in accordance therewith, wherein the second interface is operable to receive the second set of configuration information from the central registry and implement the second set of configuration information to operate in accordance therewith, and wherein the first interface and the second interface are operable to communicate with each other, without using the central registry as an intermediary, to enable information to be exchanged between the first and the second applications.

2. The system of claim 1, wherein the first interface is operable to send an update request to the central registry for a first set of updated configuration information, receive the first set of updated configuration information from the central registry, and implement the first set of updated configuration information to operate in accordance therewith, wherein implementing the first set of updated configuration information causes the first interface to change the manner in which it operates.

3. The system of claim 2, wherein implementing the first set of updated configuration information causes the first interface to change the manner in which it processes information that is sent to or received from the first application.

4. The system of claim 2, wherein implementing the first set of updated configuration information causes the first interface to change the manner in which it translates information received from the first application.

5. The system of claim 2, wherein implementing the first set of updated configuration information causes the first interface to change the manner in which it reformats information received from the first application.

6. The system of claim 2, wherein implementing the first set of updated configuration information causes the first interface to change the manner in which it performs load balancing.

7. The system of claim 2, wherein implementing the first set of updated configuration information causes the first interface to implement a different set of business logic.

8. The system of claim 2, wherein the second interface is operable to send an update request to the central registry for a second set of updated configuration information, receive the second set of updated configuration information from the central registry, and implement the second set of updated configuration to operate in accordance therewith, wherein implementing the second set of updated configuration information causes the second interface to change the manner in which it operates.

9. The system of claim 8, wherein implementing the second set of updated configuration information causes the second interface to change the manner in which it processes information that is sent to or received from the second application.

10. The system of claim 8, wherein implementing the second set of updated configuration information causes the second interface to change the manner in which it translates information received from the second application.

11. The system of claim 8, wherein implementing the second set of updated configuration information causes the second interface to change the manner in which it reformats information received from the second application.

12. The system of claim 8, wherein implementing the second set of updated configuration information causes the second interface to change the manner in which it performs load balancing.

13. The system of claim 8, wherein implementing the second set of updated configuration information causes the second interface to implement a different set of business logic.

14. The system of claim 8, wherein the central registry comprises a user interface for enabling a user to change the first set of configuration information into the first set of updated configuration information, and to change the second set of configuration information into the second set of updated configuration information.

15. The system of claim 1, wherein the central registry is operable to send an alert to the first interface indicating that the first set of configuration information has been changed, and send a first set of updated configuration information to the first interface, and wherein the first interface is operable to receive the first set of updated configuration information from the central registry, and implement the first set of updated configuration information to operate in accordance therewith, wherein implementing the first set of updated configuration information causes the first interface to change the manner in which it operates.

16. The system of claim 15, wherein implementing the first set of updated configuration information causes the first interface to change the manner in which it processes information that is sent to or received from the first application.

17. The system of claim 15, wherein implementing the first set of updated configuration information causes the first interface to change the manner in which it translates information received from the first application.

18. The system of claim 15, wherein implementing the first set of updated configuration information causes the first interface to change the manner in which it reformats information received from the first application.

19. The system of claim 15, wherein implementing the first set of updated configuration information causes the first interface to change the manner in which it performs load balancing.

20. The system of claim 15, wherein implementing the first set of updated configuration information causes the first interface to implement a different set of business logic.

21. The system of claim 15 wherein the central registry is further operable to send an alert to the second interface indicating that the second set of configuration information has been changed, and send a second set of updated configuration information to the second interface, and wherein the second interface is operable to receive the second set of updated configuration information from the central registry, and implement the second set of updated configuration information to operate in accordance therewith, wherein implementing the second set of updated configuration information causes the second interface to change the manner in which it operates.

22. The system of claim 21, wherein implementing the second set of updated configuration information causes the second interface to change the manner in which it processes information that is sent to or received from the second application.

23. The system of claim 21, wherein implementing the second set of updated configuration information causes the second interface to change the manner in which it translates information received from the second application.

24. The system of claim 21, wherein implementing the second set of updated configuration information causes the second interface to change the manner in which it reformats information received from the second application.

25. The system of claim 21, wherein implementing the second set of updated configuration information causes the second interface to change the manner in which it performs load balancing.

26. The system of claim 21, wherein implementing the second set of updated configuration information causes the second interface to implement a different set of business logic.

27. The system of claim 21, wherein the central registry comprises a user interface for enabling a user to change the first set of configuration information into the first set of updated configuration information, and to change the second set of configuration information into the second set of updated configuration information.

28. The system of claim 1, wherein the central registry is operable to store the configuration information in both a first registry and a redundant registry, and wherein the central registry is operable to use the redundant registry if the first registry is unavailable.

29. The system of claim 1, wherein the first interface comprises a first interface module for interfacing with the first application, and a first interface queue for storing information that is received from or sent to the first application, and wherein the second interface comprises a second interface module for interfacing with the second application, a second interface queue for storing information that is received from or sent to the second application, and a third interface module for processing information stored in the first and second interface queues to enable information to be exchanged between the first and the second applications.

30. The system of claim 29, wherein the first interface module is operable to receive, process, and store a first set of information from the first application into the first interface queue, wherein the third interface module is operable to extract and process the first set of information from the first interface queue and store a second set of information into the second interface queue, and wherein the second interface module is operable to extract and process the second set of information from the second interface queue, and interact with the second application to enable information to be exchanged between the first application and the second application.

31. The system of claim 29, wherein the second interface module is operable to receive, process, and store a first set of information from the second application into the second interface queue, wherein the third interface module is operable to extract and process the first set of information from the second interface queue and store a second set of information into the first interface queue, and wherein the first interface module is operable to extract and process the second set of information from the first interface queue, and interact with the first application to enable information to be exchanged between the second application and the first application.

32. In a system comprising a central registry for maintaining configuration information for various components in the system, a first interface coupled to communicate with a first application, and a second interface coupled to communicate with a second application, a method for enabling the first and second applications to exchange information, comprising:

receiving, by the first interface, a first set of configuration information from the central registry;

implementing, by the first interface, the first set of configuration information to cause the first interface to operate in accordance therewith;

receiving, by the second interface, a second set of configuration information from the central registry;

implementing, by the second interface, the second set of configuration information to cause the second interface to operate in accordance therewith; and communicating, by the first and second interfaces, with each other to enable information to be exchanged between the first and the second applications, wherein the first and second interfaces communicate with each other without using the central registry as an intermediary.

33. The method of claim 32, further comprising:

sending, by the first interface, an update request to the central registry for a first set of updated configuration information;

receiving, by the first interface, the first set of updated configuration information from the central registry; and implementing, by the first interface, the first set of updated configuration information to cause the first interface to operate in accordance therewith, wherein implementing the first set of updated configuration information causes the first interface to change the manner in which it operates.

34. The method of claim 33, wherein implementing the first set of updated configuration information causes the first interface to change the manner in which it processes information that is sent to or received from the first application.

35. The method of claim 33, wherein implementing the first set of updated configuration information causes the first interface to change the manner in which it translates information received from the first application.

36. The method of claim 33, wherein implementing the first set of updated configuration information causes the first interface to change the manner in which it reformats information received from the first application.

37. The method of claim 33, further comprising:

sending, by the second interface, an update request to the central registry for a second set of updated configuration information;

receiving, by the second interface, the second set of updated configuration information from the central registry; and implementing, by the second interface, the second set of updated configuration information to cause the second interface to operate in accordance therewith, wherein implementing the second set of updated configuration information causes the second interface to change the manner in which it operates.

38. The method of claim 37, wherein implementing the second set of updated configuration information causes the second interface to change the manner in which it processes information that is sent to or received from the second application.

39. The method of claim 37, wherein implementing the second set of updated configuration information causes the second interface to change the manner in which it translates information received from the second application.

40. The method of claim 37, wherein implementing the second set of updated configuration information causes the second interface to change the manner in which it reformats information received from the second application.

41. The method of claim 32, further comprising:

sending, by the central registry, an alert to the first interface indicating that the first set of configuration information has been changed;

sending, by the central registry, a first set of updated configuration information to the first interface;

receiving, by the first interface, the first set of updated configuration information from the central registry; and implementing, by the first interface, the first set of updated configuration information to cause the first interface to operate in accordance therewith, wherein implementing the first set of updated configuration information causes the first interface to change the manner in which it operates.

42. The method of claim 41, wherein implementing the first set of updated configuration information causes the first interface to change the manner in which it processes information that is sent to or received from the first application.

43. The method of claim 41, wherein implementing the first set of updated configuration information causes the first interface to change the manner in which it translates information received from the first application.

44. The method of claim 41, wherein implementing the first set of updated configuration information causes the first interface to change the manner in which it reformats information received from the first application.

45. The method of claim 41, further comprising:

sending, by the central registry, an alert to the second interface indicating that the second set of configuration information has been changed;

sending, by the central registry, a second set of updated configuration information to the second interface;

receiving, by the second interface, the second set of updated configuration information from the central registry; and implementing, by the second interface, the second set of updated configuration information to cause the second interface to operate in accordance therewith, wherein implementing the second set of updated configuration information causes the second interface to change the manner in which it operates.

46. The method of claim 45, wherein implementing the second set of updated configuration information causes the second interface to change the manner in which it processes information that is sent to or received from the second application.

47. The method of claim 45, wherein implementing the second set of updated configuration information causes the second interface to change the manner in which it translates information received from the second application.

48. The method of claim 45, wherein implementing the second set of updated configuration information causes the second interface to change the manner in which it reformats information received from the second application.

* * * * *